(12) United States Patent
Lee (10) Patent No.: US 10,846,487 B2
(45) Date of Patent: Nov. 24, 2020

(54) MACHINE TRANSLATION METHOD AND APPARATUS

(71) Applicant: SAMSUNG ELECTRONICS CO., LTD., Suwon-si (KR)

(72) Inventor: Hodong Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 122 days.

(21) Appl. No.: 16/030,138

(22) Filed: Jul. 9, 2018

(65) Prior Publication Data

US 2019/0236147 A1 Aug. 1, 2019

(30) Foreign Application Priority Data

Jan. 26, 2018 (KR) .......................... 10-2018-0010133

(51) Int. Cl.
*G06F 40/51* (2020.01)
*G10L 15/22* (2006.01)
*G06F 40/47* (2020.01)

(52) U.S. Cl.
CPC .............. *G06F 40/51* (2020.01); *G06F 40/47* (2020.01); *G10L 15/22* (2013.01)

(58) Field of Classification Search
CPC ........... G06F 40/51; G06F 40/47; G10L 15/22
See application file for complete search history.

(56) References Cited

U.S. PATENT DOCUMENTS

| | | | |
|---|---|---|---|
| 9,164,987 B2* | 10/2015 | Chen | G06F 16/951 |
| 9,710,429 B1* | 7/2017 | Raghunath | G06F 17/20 |
| 2011/0131032 A1* | 6/2011 | Yang | G06F 17/2818 704/2 |
| 2013/0262077 A1* | 10/2013 | Fuji | G06F 17/28 704/2 |
| 2016/0350290 A1* | 12/2016 | Fujiwara | G06F 17/2854 |
| 2018/0011843 A1* | 1/2018 | Lee | G06F 17/2854 |

FOREIGN PATENT DOCUMENTS

| | | |
|---|---|---|
| JP | 2008-83878 A | 4/2008 |
| JP | 2009-223593 A | 10/2009 |
| JP | 5173648 B2 | 4/2013 |
| JP | 2013-206397 A | 10/2013 |
| JP | 2016-51433 A | 4/2016 |
| JP | 6160438 B2 | 7/2017 |
| KR | 10-2005-0034687 A | 4/2005 |
| KR | 10-2009-0042201 A | 4/2009 |
| KR | 10-2011-0133298 A | 12/2011 |
| KR | 10-2012-0005213 A | 1/2012 |
| KR | 10-2014-0079598 A | 6/2014 |
| KR | 10-1740671 B1 | 5/2017 |

* cited by examiner

*Primary Examiner* — Nafiz E Hoque
(74) *Attorney, Agent, or Firm* — NSIP Law

(57) ABSTRACT

A processor-implemented machine translation method includes generating a target sentence by translating a source sentence expressed in a source language into a target language; and determining a reliability of the target sentence based on one or more generated third sentences generated by translating either one or both of the source sentence and the target sentence into a third language.

27 Claims, 7 Drawing Sheets

| Source language \ Target language | Korean | English | Japanese | Chinese | ··· |
|---|---|---|---|---|---|
| Korean | - | 0.92 | 0.89 | 0.36 | |
| English | 0.82 | - | 0.96 | 0.91 | |
| Japanese | 0.91 | 0.90 | - | 0.31 | |
| Chinese | 0.41 | 0.91 | 0.42 | - | |
| ⋮ | | | | | |

MACHINE TRANSLATION METHOD AND APPARATUS

CROSS-REFERENCE TO RELATED APPLICATIONS

This application claims the benefit under 35 USC § 119(a) of Korean Patent Application No. 10-2018-0010133, filed on Jan. 26, 2018, in the Korean Intellectual Property Office, the entire disclosure of which is incorporated herein by reference for all purposes.

BACKGROUND

1. Field

The following description relates to relates to a machine translation method and apparatus.

2. Description of Related Art

A user may use machine translation to translate a sentence, a paragraph, a phrase or a word that is expressed in a first language to a second language.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor-implemented machine translation method including: generating a target sentence by translating a source sentence expressed in a source language into a target language; and determining a reliability of the target sentence based on one or more generated third sentences generated by translating either one or both of the source sentence and the target sentence into a third language.

The machine translation method may further include determining whether to output the target sentence as a translation result of the source sentence based on the reliability.

The machine translation method may further include outputting the target sentence in response to the reliability being greater than or equal to a threshold.

The machine translation method may further include converting the target sentence to a speech signal expressed in the target language and outputting the speech signal via a sensor, in response to determining to output the target sentence as a translation result of the source sentence, wherein the source sentence may be a sentence generated by converting a speech signal obtained via a sensor.

The determining of the reliability of the target sentence may include determining the reliability based on a similarity between third sentences of the one or more third sentences generated by translating each of the source sentence and the target sentence into the third language.

The reliability of the target sentence may increase in response to an increase in the similarity between the third sentences, and the reliability of the target sentence may decrease in response to a decrease in the similarity between the third sentences.

The determining of the reliability may include: determining a first reliability of the target sentence based on a third sentence of the one or more third sentences and a respective weight; and determining a second reliability of another target sentence, generated by another translation of the source sentence expressed in the source language into the target language, based on another third sentence of the one or more third sentences and a respective other weight.

The machine translation method may further include indicating either one of the target sentence and the other target sentence as a translation result of the source sentence, based on a comparison of the first and second reliabilities.

The determining of the reliability of the target sentence may include: generating a comparison sentence by translating, into the target language, a third sentence of the one or more third sentences generated by translating the source sentence into the third language; and determining the reliability of the target sentence based on a similarity between the comparison sentence and the target sentence.

The determining of the reliability may include: generating a comparison sentence by translating, into the target language, a third sentence of the one or more third sentences generated by translating the target sentence into the third language; and determining the reliability of the target sentence based on a similarity between the comparison sentence and the target sentence.

The third language may include one or more languages other than the source language and the target language.

The third language may be selected from plural third languages based on a predetermined accuracy of a translation model used to translate between the third language and either one or both of the source language and the target language.

The determining of the reliability of the target sentence may include: generating a plurality of third sentences of the one or more third sentences by translating either one or both of the source sentence and the target sentence into each of a plurality of third languages; and determining the reliability of the target sentence based on the plurality of third sentences.

The determining of the reliability of the target sentence may include: determining a similarity between third sentences of the plurality of third sentences expressed in a corresponding third language of the plurality of third languages; and determining the reliability of the target sentence based on the determined similarity.

The determining of the reliability may include: determining a weight of the corresponding third language based on an accuracy of either one or both of a model that translates the source language into the corresponding third language and an accuracy of a model that translates the target language into the corresponding third language; applying the determined weight to the similarity; and determining the reliability of the target sentence based on the product of the determined weight and the similarity.

The determining of the reliability may include: generating a comparison sentence by translating, into the target language, a third sentence of the plurality of third sentences; and determining the reliability of the target sentence based on a similarity between the target sentence and the comparison sentence.

A non-transitory computer-readable storage medium may store instructions that, when executed by a processor, cause the processor to perform the machine translation method.

In another genera aspect, there is provided a machine translation apparatus including: one or more processors configured to: generate a target sentence by translating a source sentence expressed in a source language into a target language; and determine a reliability of the target sentence based on one or more third sentences generated by translating either one or both of the source sentence and the target sentence into a third language.

The one or more processors may be configured to determine the reliability of the target sentence based on a similarity between third sentences of the one or more third sentences generated by translating each of the source sentence and the target sentence into the third language.

The one or more processors may be configured to: generate a comparison sentence by translating, into the target language, a third sentence of the one or more third sentences generated by translating the source sentence into the third language in; and determine the reliability of the target sentence based on a similarity between the comparison sentence and the target sentence.

The one or more processors may be configured to: generate a comparison sentence by translating, into the target language, a third sentence of the one or more third sentences generated by translating the target sentence into the third language; and determine the reliability of the target sentence based on a similarity between the comparison sentence and the target sentence.

The third language may include one or more languages other than the source language and the target language.

The machine translation apparatus may further include a memory configured to store one or more instructions, wherein the one or more processors may be configured to generate the target sentence and determine the reliability of the target sentence, in response to executing the one or more instructions.

In another general aspect, there is provided a processor-implemented machine translation method including: generating target sentences by translating a source sentence expressed in a source language into a target language; determining reliabilities of the target sentences based a translation of either one or both of the source sentence and the target sentence into a language different than the source language and the target language; and indicating, as a translation result of the source sentence, a target sentence of the target sentences corresponding to a highest reliability of the reliabilities.

The machine translation method may further include generating one or more different language sentences by translating either one or both of the source sentence and the target sentences into the different language.

The determining of the reliabilities of the target sentences may include determining the reliabilities based on similarities between different language sentences of the one or more different language sentences.

The machine translation method may further include generating one or more comparison sentences by translating the one or more different language sentences into the target language, wherein the determining of the reliabilities of the target sentences may include determining the reliabilities based on similarities between the target sentences and the one or more comparison sentences.

Other features and aspects will be apparent from the following detailed description, the drawings, and the claims. Additional aspects will be set forth in part in the description which follows and, in part, will be apparent from the description, or may be learned by practice of the presented embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises" and/or "comprising," when used herein, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood in view of the present application. Terms defined in dictionaries generally used should be construed to have meanings matching with contextual meanings in the related art and the present application and are not to be construed as an ideal or excessively formal meaning unless otherwise defined herein.

Hereinafter, examples will be described in detail with reference to the accompanying drawings, and like reference numerals in the drawings refer to like elements throughout.

Figure 1:
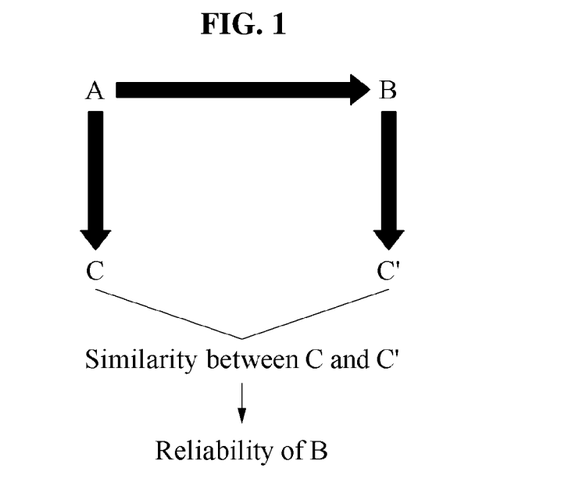
FIG. 1 illustrates an example of a machine translation process using a third language.

FIG. 1 illustrates an example of a machine translation process using a third language.

A machine translation apparatus is an apparatus specially configured to perform translation of a source sentence A expressed in a source language into a target language to determine a target sentence B, wherein the target sentence B is expressed in the target language. The machine translation apparatus may perform this by implementing a specially trained first-second language translation model. As a non-limiting example, such a first-second language translation model may be a neural network previously trained through a back-propagation process based on training data in the first and second languages. The machine translation apparatus determines whether the target sentence B is to be output as a translation result of the source sentence A, based on a determined reliability of the target sentence B. When the reliability of the target sentence B satisfies a predetermined criterion, the machine translation apparatus outputs or indicates the target sentence B as the translation result of the source sentence A. When the reliability of the target sentence B does not satisfy the criterion, the machine translation apparatus does not output the target sentence B as the translation result of the source sentence A. For example, the criterion is variously determined based on either one or both of whether the reliability of the target sentence B meets or exceeds a preset threshold and whether the target sentence B, generated in the machine translation, has a determined highest reliability among plural determined candidate target sentences corresponding to the source sentence A.

As described above, whether the target sentence B is to be output as the translation result of the source sentence A is determined based on the reliability of the target sentence B. Further, the reliability of the target sentence B is determined using the third language.

FIG. 1 illustrates a process of determining the reliability of the target sentence B based on third sentences C and C' that are generated by translating the source sentence A and the target sentence B into the third language, respectively. In FIG. 1, a bold arrow indicates a direction of a translation using a model.

The machine translation apparatus determines the target sentence B by translating the source sentence A into the target language. As noted above, the first-second language machine translation model may be used by the machine translation apparatus. The trained parameters of the first-second language translation model may be stored in the memory of the machine translation apparatus, and upon loading the parameters, the processor of the machine translation apparatus may implement the first-second language translation model. The first-second language translation model translates the source language into the target language. Also, the machine translation apparatus determines the third sentence C by translating the source sentence A into the third language and determines the third sentence C' by translating the target sentence B into the third language. Similar to above, a specially trained first-third language translation model may be implemented by the processor of the first-third translation model to translate the source language into the third language and the specially trained second-third language translation model translates the target language into the third language are used. The respective parameters of the example first-third language translation model and the example second-third translation model may be stored in the memory of the machine translation apparatus.

The third language includes, for example, languages other than the source language and the target language. In an example, an accuracy of a translation model used to translate the source language to the third language and an accuracy of a translation model used to translate the target language to the third language are greater than or equal to a predetermined level, wherein translation models having accuracies equal to or greater than the predetermined level are more accurate than translation models having accuracies below the predetermined level. Thus, by using the third language translation models having predetermined accuracies equal to or greater than the predetermined level, a translation error occurring in the translation of the source sentence into the third language or the translation of the target sentence into the third language may be prevented or reduced (compared to when using translation models having accuracies below the predetermined level). Therefore, as the third language translation models have little or no translation error, a low similarity between the third sentences C and C' is not due to the third language translation models, and a low similarity between the third sentences C and C' instead indicates a low accuracy of translation between the source sentence A and the target sentence B. Similarly, a high similarity between the third sentences C and C' indicates a high accuracy of translation between the source sentence A and the target sentence B. Thus, the similarity between the source sentence A and the target sentence B may be determined using the third language models by determining the similarity between the third sentences C and C'. Accordingly, the machine translation apparatus as disclosed herein is configured to determine the accuracy and reliability of a translation from a source language to a target language (e.g., the reliability of the target sentence B) by using a third language translation and corresponding model.

A typical back-translation reliability approach is preferred to may determine a target sentence similarity and/or reliability by comparing a back-translated source sentence (generated by translating the target sentence back to the source language) with the source sentence. However, the source sentence may include a source expression preferred by a user (for example, a vocabulary selection, tenses, honorifics, utilization of an ending of a word, a postposition, a suffix or a prefix) which may be common in the source language but uncommon or nonexistent in the target language. Accordingly, in translating the source sentence into the target sentence, this source expression may be roughly translated, supplemented with a similar target expression, or simply not included in the target sentence (e.g., the expression may be lost in translation). Accordingly, the target sentence may contain different phrasing or a different expression than the source sentence, while still capturing the overall intent or meaning of the source sentence. What is more, when the target sentence is back-translated in this typical approach into the back-translated source sentence, a similar situation may occur in which, due to the difference between the target language and the source language, expressions of the target sentence may be roughly translated, supplemented with a similar source expression, or simply not included in the back-translated source sentence. Accordingly, the back-translated source sentence may have a similarity with the source sentence that is less than a true similarity between the target sentence and the source sentence. Accordingly, the typical back-translation reliability approach, or the typical back-translation approach alone, may inaccurately determine that there is a low similarity/reliability between the target sentence and the source sentence, due to the low similarity between the back-translated source sentence and the source sentence. However, the machine translation apparatus as disclosed herein may at least determine a similarity between the third sentences C and C'. The machine translation apparatus compares sentences generated via a same translation model to each other to determine a similarity between the sentences. Because a translation model may be obtained by modeling vocabularies or grammars in a normalized mapping space based on a large quantity of corpus data, translations generated through similar normalization processes in a translation process are similar in overall sentence style. By generating third sentences by translating both the source sentence and the target sentence into the same third language, expressions of the source language in the source sentence and corresponding expressions of the target language in the target sentence will both be translated into similar, if not identical, expressions of the third language in the third sentences. Thus, an occurrence of an error in which a low similarity between sentences is determined due to an expression preferred by a user (for example, a vocabulary selection, tenses, honorifics, utilization of an ending of a word, a postposition, a suffix or a prefix) may be prevented or minimized, even when the sentences have the same meaning.

In an example, when the source sentence A is translated with a high accuracy to determine the target sentence B, a high similarity between the third sentences C and C' is determined. To the contrary, when the source sentence A is translated with a low accuracy to determine the target sentence B, a low similarity between the third sentences C and C' is determined.

The machine translation apparatus determines the reliability of the target sentence B based on the similarity between the third sentences C and C'. For example, when the similarity between the third sentences C and C' increases, the reliability of the target sentence B is determined to increase. When the similarity between the third sentences C and C' decreases, the reliability of the target sentence B is determined to decrease. In an example, when the similarity between the third sentences C and C' is high, the determined reliability of the target sentence B is high; and when the similarity between the third sentences C and C' is low, the determined reliability of the target sentence B is low.

In an example, process of determining the third sentence C by translating the source sentence A into the third language, and a process of determining the third sentence C' by translating the target sentence B into the third language are performed through parallel processing, and thus an increase in an amount of processing time used by a typical machine translation apparatus that performs the aforementioned back-translation approach may be prevented. Also, by translating the source sentence A and the target sentence B into third sentences C and C', respectively, a processing time used by the machine translation apparatus is reduced, compared to if the source sentence A and the target sentence B were translated non-contemporaneously. The machine translation apparatus determines whether the target sentence is to be output as a translation result of the source sentence A based on the reliability of the target sentence B. For example, when the reliability of the target sentence B is greater than or equal to a threshold, the target sentence B may be output as a translation result of the source sentence A. When the target sentence A is determined to be output as the translation result of the source sentence B, the machine translation apparatus may convert the target sentence to a target speech signal expressed in the target language and outputs the target sentence via a user interface. For example, the machine translation apparatus uses a text-to-speech (TTS) to convert the target sentence to the target speech signal and output the target sentence to a speaker of the machine translation apparatus, or the machine translation apparatus may output the target sentence as text to a graphical user interface of the machine translation apparatus.

A plurality of candidate target sentences corresponding to the source sentence A are determined, and one of the plurality of candidate target sentences is determined as a translation result of the source sentence A based on a reliability, which will be further described below with reference to FIGS. 2, 3, and 4.

Figure 2:
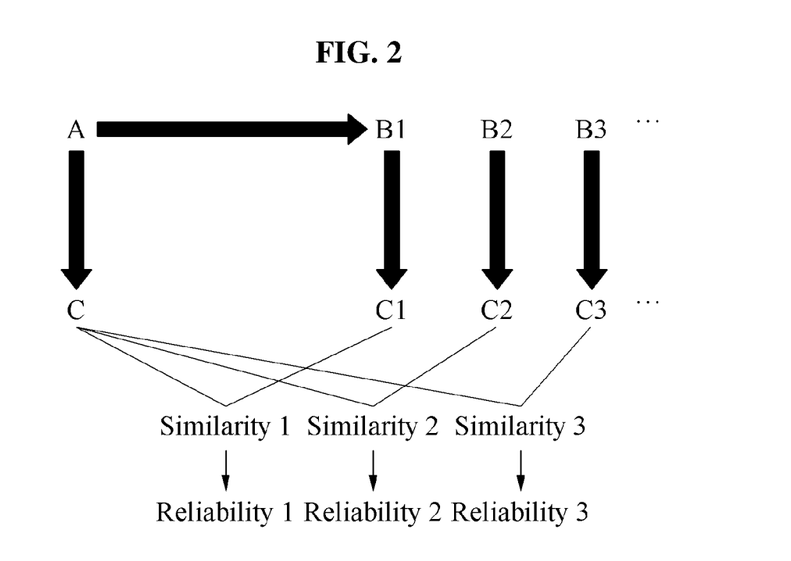
FIGS. 2, 3 and 4 illustrate examples of determining one of a plurality of candidate target sentences as a translation result.
Figure 3:
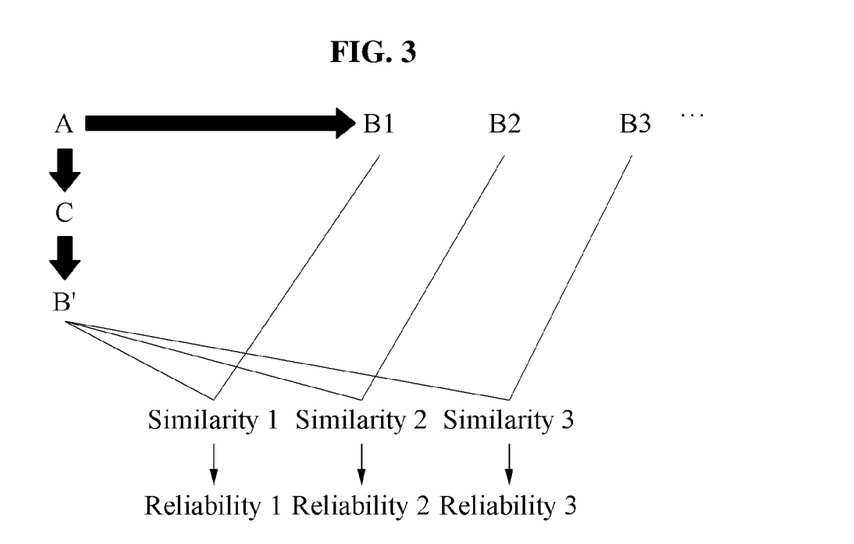
Figure 4:
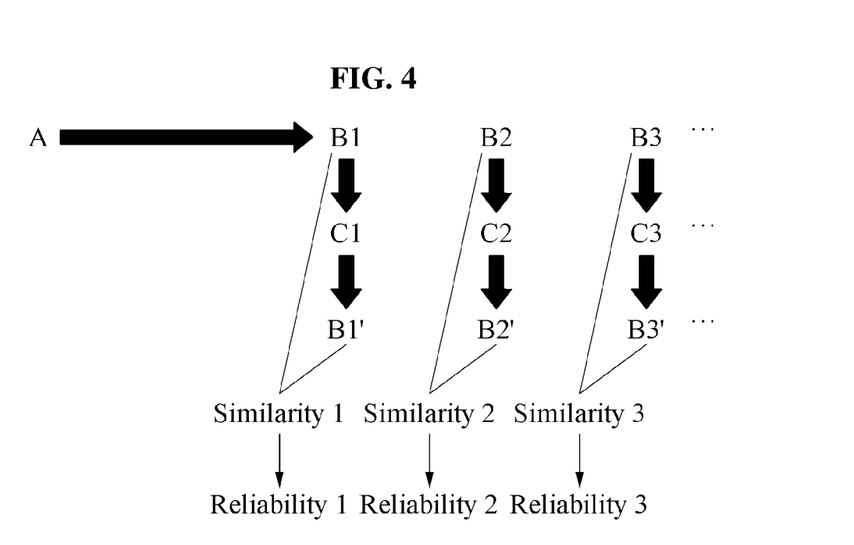

FIGS. 2 through 4 illustrate examples of determining one of a plurality of candidate target sentences as a translation result.

Referring to FIG. 2, one of a plurality of candidate target sentences, for example, candidate target sentences B1, B2, and B3, is determined as a translation result of a source sentence A, based on a similarity 1 between third sentences C and C1, a similarity 2 between third sentences C and C2, and/or a similarity 3 between third sentences C and C3.

The machine translation apparatus determines the candidate target sentences B1 through B3 corresponding to the source sentence A using a model that translates a source language into a target language. That is, the machine translation apparatus determines the candidate target sentences B1 through B3 of the target language by translating the source sentence A of the source language. Although three candidate target sentences are shown in FIG. 2 for convenience of description, a number of candidate target sentences is not limited thereto.

The machine translation apparatus determines the third sentence C corresponding to the source sentence A using a model that translates the source language into a third language. That is, the machine translation apparatus determines the third sentences C of the third language by translating the source sentence A of the source language. The machine translation apparatus determines the third sentences C1 through C3 respectively corresponding to the candidate target sentences B1 through B3 using a model that translates the target language into the third language. That is, the machine translation apparatus determines the third sentences C1 through C3 of the third language by respectively translating the candidate target sentences B1 through B3 of the target language. The machine translation apparatus determines the similarities 1 through 3. That is, the machine translation apparatus determines the similarities 1 through 3 by respectively comparing the third sentence C with each of the third sentences C1 through C3.

For example, a similarity is determined using one of a bilingual evaluation understudy (BLEU), a National Institute of Standards and Technology (NIST), a word error rate (WER), a Metric for Evaluation of Translation with Explicit Ordering (METEOR), a Recall-Oriented Understudy for Gisting Evaluation (ROUGE) and an F1 score. Also, the similarity is determined by a model trained to determine a similarity between sentences.

The machine translation apparatus determines a reliability 1 of the candidate target sentence B1 based on the similarity 1, determines a reliability 2 of the candidate target sentence B2 based on the similarity 2, and determines a reliability 3 of the candidate target sentence B3 based on the similarity 3.

Also, the machine translation apparatus determines a candidate target sentence with a highest reliability among the determined reliabilities 1 through 3 to be output as a translation result of the source sentence A. Whether the highest reliability exceeds a predetermined threshold is additionally determined.

Referring to FIG. 3, one of a plurality of candidate target sentences, for example, candidate target sentences B1, B2 and B3, is determined as a translation result of a source sentence A based on a similarity 1 between a comparison sentence B' and the candidate target sentence B1, a similarity 2 between the comparison sentence B' and the candidate target sentence B2, and a similarity 3 between the comparison sentence B' and the candidate target sentence B3.

The machine translation apparatus determines the candidate target sentences B1 through B3 corresponding to the source sentence A using a model that translates a source language into a target language. That is, the machine translation apparatus determines the candidate target sentences B1 through B3 of the target language by respectively translating the source sentence A of the source language. Although three candidate target sentences are shown in FIG. 3 for convenience of description, a number of candidate target sentences is not limited thereto.

The machine translation apparatus determines a third sentence C corresponding to the source sentence A using a model that translates the source language into a third language. That is, the machine translation apparatus determines the third sentences C of the third language by translating the source sentence A of the source language. The machine translation apparatus determines the comparison sentence B' corresponding to the third sentence C using a model that translates the third language into the target language. That is, the machine translation apparatus determines the comparison sentence B' of the target language by translating the third sentence C of the third language. The machine translation apparatus determines the similarities 1 through 3. For example, the machine translation apparatus determines the similarity 1 between the candidate target sentence B1 and the comparison sentence B'. Similarly, the machine translation apparatus determines the similarities 2 and 3. That is, the machine translation apparatus determines the similarities 1 through 3 by respectively comparing each of the candidate target sentences B1 through B3 with the comparison sentence B'.

The machine translation apparatus determines a reliability 1 of the candidate target sentence B1 based on the similarity 1, determines a reliability 2 of the candidate target sentence B2 based on the similarity 2, and determines a reliability 3 of the candidate target sentence B3 based on the similarity 3. Also, the machine translation apparatus determines a candidate target sentence with a highest reliability among the determined reliabilities 1 through 3 as a translation result of the source sentence A. Whether the highest reliability exceeds a predetermined threshold is additionally determined.

Referring to FIG. 4, one of a plurality of candidate target sentences, for example, candidate target sentences B1, B2 and B3, is determined as a translation result of a source sentence A based on a similarity 1 between the candidate target sentence B1 and a comparison sentence B1', a similarity 2 between the candidate target sentence B2 and a comparison sentence B2', and a similarity 3 between the candidate target sentence B3 and a comparison sentence B3'.

The machine translation apparatus determines the candidate target sentences B1 through B3 corresponding to the source sentence A using a model that translates a source language into a target language. That is, the machine translation apparatus determines the candidate target sentences B1 through B3 of the target language by respectively translating the source sentence A of the source language. Although three candidate target sentences are shown in FIG. 4 for convenience of description, a number of candidate target sentences is not limited thereto.

The machine translation apparatus determines a plurality of third sentences, for example, third sentences C1, C2 and C3 that respectively correspond to the candidate target sentences B1 through B3 using a model that translates the target language into a third language. That is, the machine translation apparatus determines the third sentences C1 through C3 of the third language by respectively translating the candidate target sentences B1 through B3 of the target language. The machine translation apparatus determines the comparison sentences B1' through B3' that respectively correspond to the third sentences C1 through C3 using a model that translates the third language into the target language. That is, the machine translation apparatus determines the comparison sentences B1' through B3' of the target language by respectively translating the third sentences C1 through C3 of the third language.

The machine translation apparatus determines a similarity between a candidate target sentence and a corresponding comparison sentence. For example, the machine translation apparatus determines the similarity 1 between the candidate target sentence B1 and the corresponding comparison sentence B1'. Similarly, the machine translation apparatus determines the similarities 2 and 3. That is, the machine translation apparatus determines the similarities 1 through 3 by respectively comparing the target sentences B1 through B3 with the respectively corresponding comparison sentence B1', B2', B3'.

The machine translation apparatus determines a reliability 1 of the candidate target sentence B1 based on the similarity 1, determines a reliability 2 of the candidate target sentence B2 based on the similarity 2, and determines a reliability 3 of the candidate target sentence B3 based on the similarity 3. Also, the machine translation apparatus determines a candidate target sentence with a highest reliability among the determined reliabilities 1 through 3 as a translation result of the source sentence A. Whether the highest reliability exceeds a predetermined threshold is additionally determined.

Figure 5:
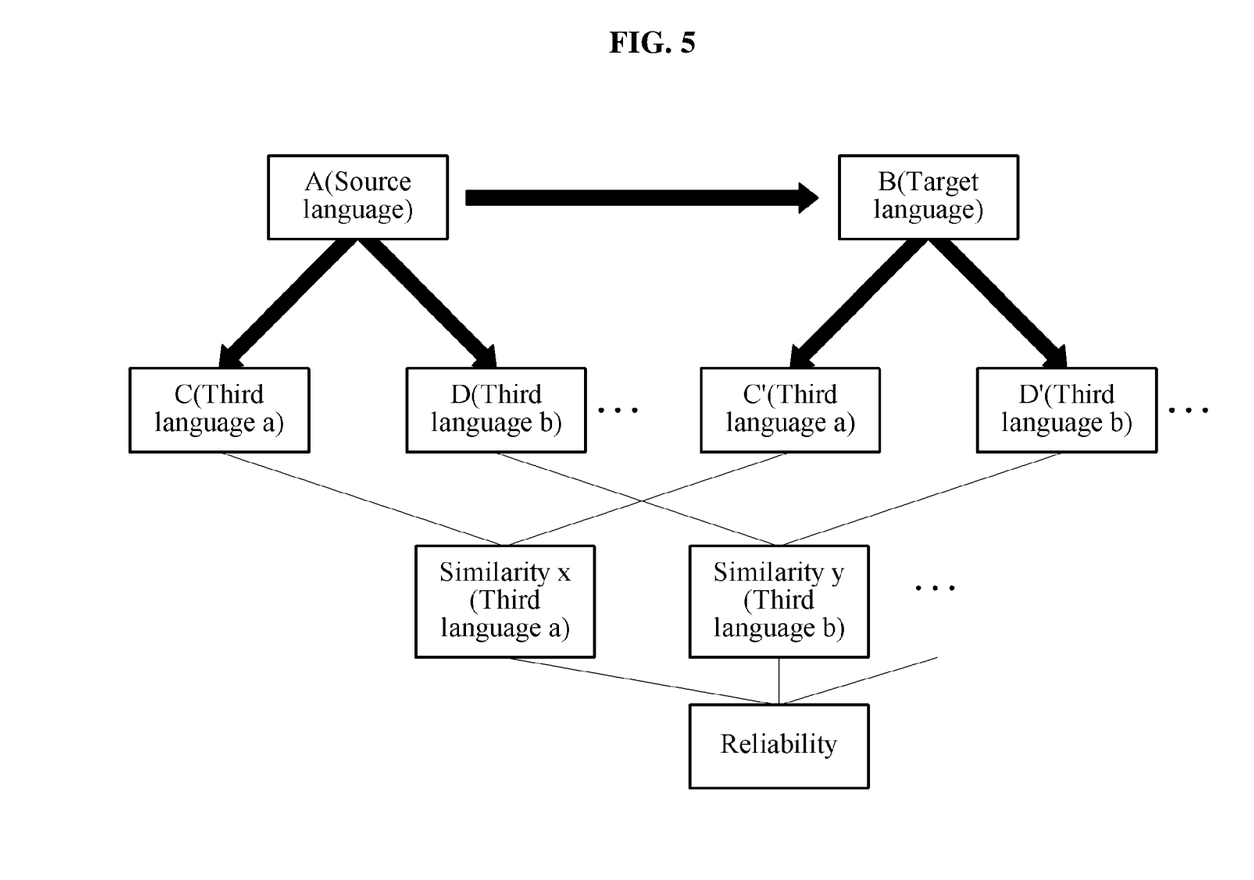
FIG. 5 illustrates an example of a machine translation process using a plurality of third languages.

FIG. 5 illustrates an example of a machine translation process using a plurality of third languages.

Referring to FIG. 5, a reliability of a target sentence B is determined using a plurality of third languages. Although two third languages, for example, third languages a and b, are shown in FIG. 5 for convenience of description, a number of third languages is not limited thereto. For example, in FIG. 5, a source language is Korean, a target language is English, the third language a is Chinese, and the third language b is Japanese.

A machine translation apparatus translates a source sentence A expressed in the source language into the target language to determine a target sentence B. The machine translation apparatus translates each of the source sentence A and the target sentence B into the third language a to determine third sentences C and C'. That is, the machine translation apparatus determines third sentences C and C' by translating the source sentence A and the target sentence B, respectively, into the third language a. Also, the machine translation apparatus determines a similarity x between the third sentences C and C'.

Also, the machine translation apparatus translates each of the source sentence A and the target sentence B into the third language b to determine third sentences D and D'. That is, the machine translation apparatus determines third sentences D and D' by translating the source sentence A and the target sentence B, respectively, into the third language b. The machine translation apparatus determines a similarity y between the third sentences D and D'.

The machine translation apparatus determines a reliability of the target sentence B based on the similarities x and y. For example, the machine translation apparatus determines the reliability based on an average of the similarities x and y.

In another example, the machine translation apparatus determines the reliability based on an average of the product of the similarity x and a corresponding weight, and the product of the similarity y and a corresponding weight. The machine translation apparatus applies the weights to the similarities x and y to determine the reliability. The weights applied to the similarities x and y are determined based on the third languages a and b. For example, a corresponding weight to be applied to similarity x is determined based on an accuracy of a model that translates the source language into the third language a and an accuracy of a model that translates the target language into the third language a, and the determined weight is applied to the similarity x. Similarly, a corresponding weight to be applied to similarity y is determined based on an accuracy of a model that translates the source language into the third language b and an accuracy of a model that translates the target language into the third language b, and the determined weight is applied to the similarity y. When accuracies of models for translations into third languages increase, weights applied to corresponding similarities increase, to determine the reliability. Thus, it is possible to effectively prevent a translation error occurring in a process of translating the source sentence or the target sentence into a third language from being reflected in the reliability. That is, an effect of a translation error due to an inaccuracy of a translation model will be reduced, as a weight corresponding to a similarity that is based on the translation model will be less than another weight corresponding to another similarity that is based on a more-accurate translation model.

Although a process of translating each of the source sentence and the target sentence into a plurality of third languages is shown in FIG. 5, examples are not limited thereto. For example, the plurality of third languages may be used in the examples of FIGS. 3 and 4.

Figure 6:
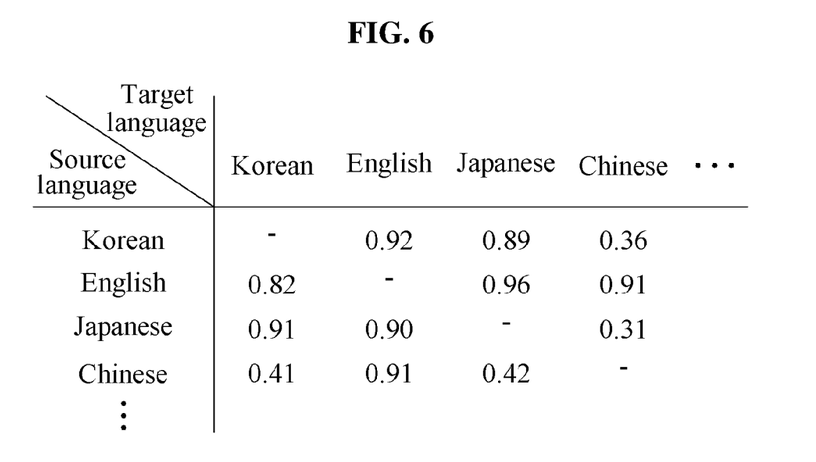
FIG. 6 illustrates an example of an accuracy of a translation model.

FIG. 6 illustrates an example of an accuracy of a translation model.

FIG. 6 illustrates accuracies of translation models that translate a source language into a target language. The accuracies of the translation models of FIG. 6 are merely an example for convenience of description and may differ from an accuracy of a real translation model.

A machine translation apparatus uses a third language to calculate a reliability of a target sentence. The third language is determined based on an accuracy of a translation model between the third language and one of the source language and the target language.

In a table of FIG. 6, a source language is a language of a sentence that is input to a translation model and that is to be translated, and a target language is a language of a sentence that is output as a translation result from a translation model. As shown in the table, an accuracy of a translation model is determined based on a source language and a target language. For example, an accuracy of a model that translates English into Korean is "0.82," and an accuracy of a model that translates Korean into English is "0.92."

The machine translation apparatus performs a translation into the third language using a translation model with at least a predetermined level of an accuracy, to prevent a reliability of the target sentence from being incorrectly calculated due to a translation error that may occur in a process of translating at least one of the source sentence and the target sentence into the third language. For example, in the example of FIG. 2, a third language is selected based on model accuracy, such that an accuracy of a model that translates a source language into the third language and an accuracy of a model that translates a target language into the third language are each greater than or equal to a predetermined level. In the example of FIG. 3, a third language is selected based on model accuracy, such that an accuracy of a model that translates a source language into the third language and an accuracy of a model that translates the third language into a target language are each greater than or equal to a predetermined level. In the example of FIG. 4, a third language is selected based on model accuracy, such that an accuracy of a model that translates a target language into the third language and an accuracy of a model that translates the third language into the target language are each greater than or equal to a predetermined level.

In the example of FIG. 5, when a plurality of third languages are used, the machine translation apparatus determines a reliability of a target sentence by applying a weight determined based on an accuracy of a translation model to a similarity determined for a corresponding third language.

The machine translation apparatus excludes a translation model with an accuracy that does not satisfy (i.e., is less than) a predetermined threshold. In an example, Chinese is not selected as the third language (and therefore the model that translates Japanese into Chinese is not selected) in response to either one or both of the source language and the target language being Japanese and in response to the model that translates Japanese into Chinese having an accuracy below the threshold. That is, for example, a threshold is "0.80", and a model that translates Japanese into Chinese has an accuracy of "0.31", which does not exceed the "0.80" threshold. In this example, when a source language and/or a target language is Japanese, the machine translation apparatus excludes a portion of languages to prevent Chinese from being used as a third language. In another example, either one or both of Korean and English is selected as the third language (and therefore the model that translates Japanese into Korean or English is selected) in response to either one or both of the source language and the target language being Japanese and in response to the model that translates Japanese into Korean or English having an accuracy above the threshold. That is, for example, a threshold is "0.80", and a model that translates Japanese into Korean or English has an accuracy of "0.91" or "0.90", which exceeds the "0.80" threshold. In this example, when a source language and/or a target language is Japanese, the machine translation apparatus uses at least one of Korean and English as a third language.

Figure 7:
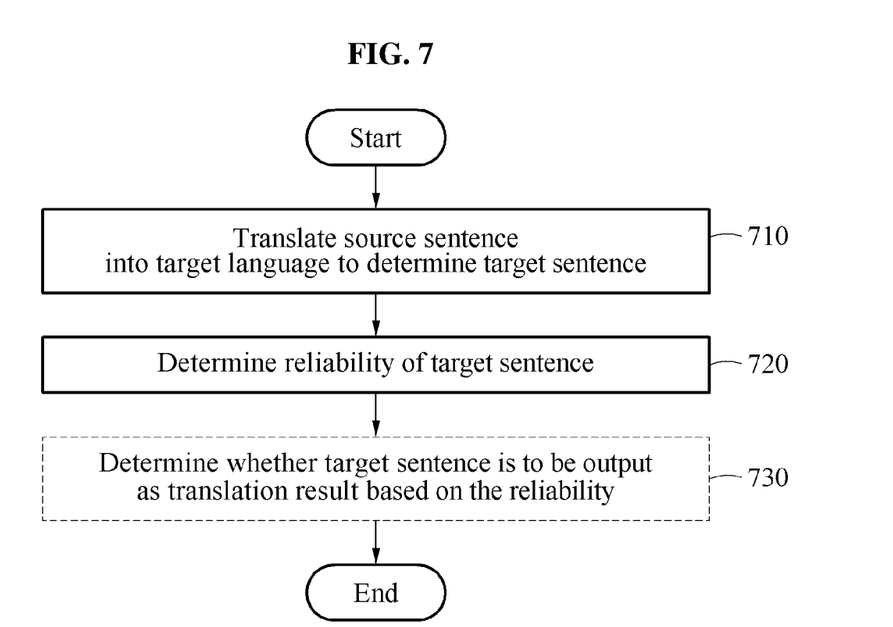
FIGS. 7 and 8 illustrate examples of a machine translation method.
Figure 8:
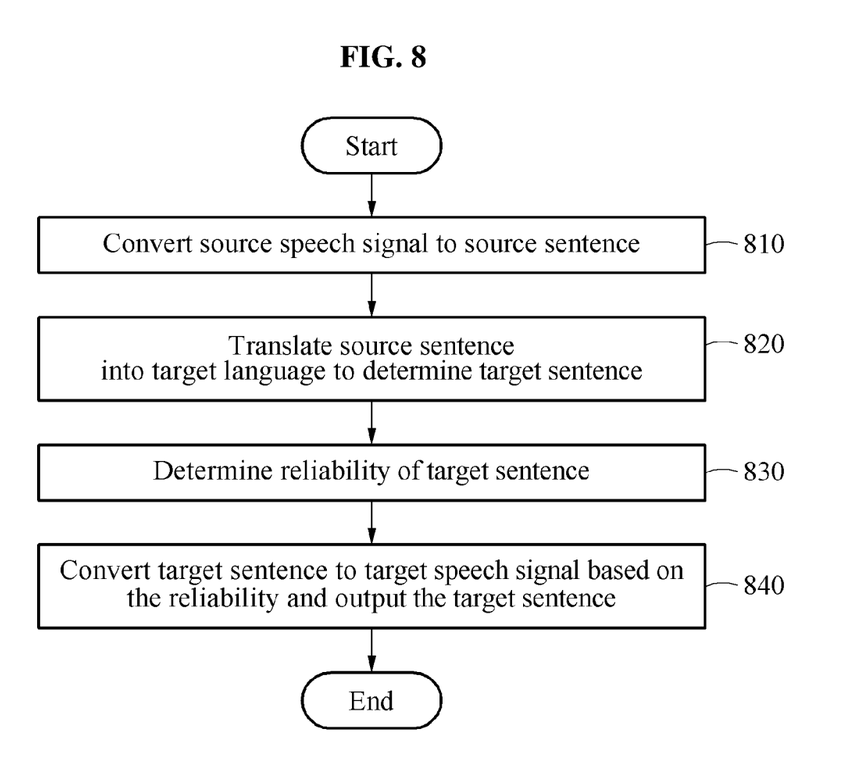

FIGS. 7 and 8 illustrate examples of a machine translation method.

FIG. 7 illustrates an example of a machine translation method performed by one or more processors included in a machine translation apparatus.

Referring to FIG. 7, in operation 710, the machine translation apparatus determines a target sentence expressed in a target language by translating a source sentence expressed in a source language. For example, the machine translation apparatus determines a target sentence corresponding to the source sentence using a model that translates the source language into the target language. The machine translation apparatus also determines a plurality of candidate target sentences corresponding to the source sentence.

In operation 720, the machine translation apparatus determines a reliability of the target sentence based on a third sentence generated by translating at least one of the source sentence and the target sentence into a third language.

For example, the machine translation apparatus determines the reliability of the target sentence based on a similarity between third sentences generated by translating each of the source sentence and the target sentence into the third language. The machine translation apparatus determines the reliability of the target sentence to increase when the similarity between the third sentences increases.

The machine translation apparatus translates a third sentence generated by translating the source sentence into the third language into the target language to generate a comparison sentence, and determines the reliability of the target sentence based on a similarity between the comparison sentence and the target sentence.

Also, the machine translation apparatus translates a third sentence generated by translating the target sentence into the third language into the target language to generate a comparison sentence, and determines the reliability of the target sentence based on a similarity between the comparison sentence and the target sentence.

The third language includes, for example, one or more languages other than the source language and the target language. The third language is determined based on an accuracy of a translation model between the third language and one of the source language and the target language.

In operation 730, the machine translation apparatus determines whether the target sentence is to be output as a translation result of the source sentence based on the reliability. In an example, when the reliability of the target sentence satisfies a predetermined criterion, the machine translation apparatus outputs the target sentence as the translation result of the source sentence. In another example, when the reliability of the target sentence does not satisfy the criterion, the machine translation apparatus does not output the target sentence as the translation result of the source sentence.

The above description of FIGS. 1 through 6 is also applicable to operations 710 through 730 of FIG. 7, and accordingly is not repeated here.

FIG. 8 illustrates an example in which a source sentence is input as a speech signal and a target sentence is output as a speech signal.

In operation 810, a machine translation apparatus converts a source speech signal input by a user to a source sentence. For example, the machine translation apparatus converts the source speech signal to the source sentence using a speech recognition model. Further, the source speech signal may be determined based on a sound signal detected by a sensor (e.g., a microphone) of the machine translation apparatus.

In operation 820, the machine translation apparatus determines a target sentence expressed as a target language by translating a source sentence expressed in a source language.

In operation 830, the machine translation apparatus determines a reliability of the target sentence based on a third sentence generated by translating at least one of the source sentence and the target sentence into a third language.

In operation 840, the machine translation apparatus determines whether the target sentence is to be output as a translation result of the source sentence based on the reliability. When the target sentence is determined to be output as the translation result of the source sentence, the machine translation apparatus converts the target sentence to a target speech signal expressed in the target language and outputs the target sentence. For example, the machine translation apparatus uses a text-to-speech (TTS) to convert the target sentence to the target speech signal and output the target sentence via a speaker of the machine translation apparatus, or the machine translation apparatus may output the target sentence as text to a graphical user interface of the machine translation apparatus.

The above description of FIGS. 1 through 7 is also applicable to operations 810 through 840 of FIG. 8, and accordingly is not repeated here.

Figure 9:
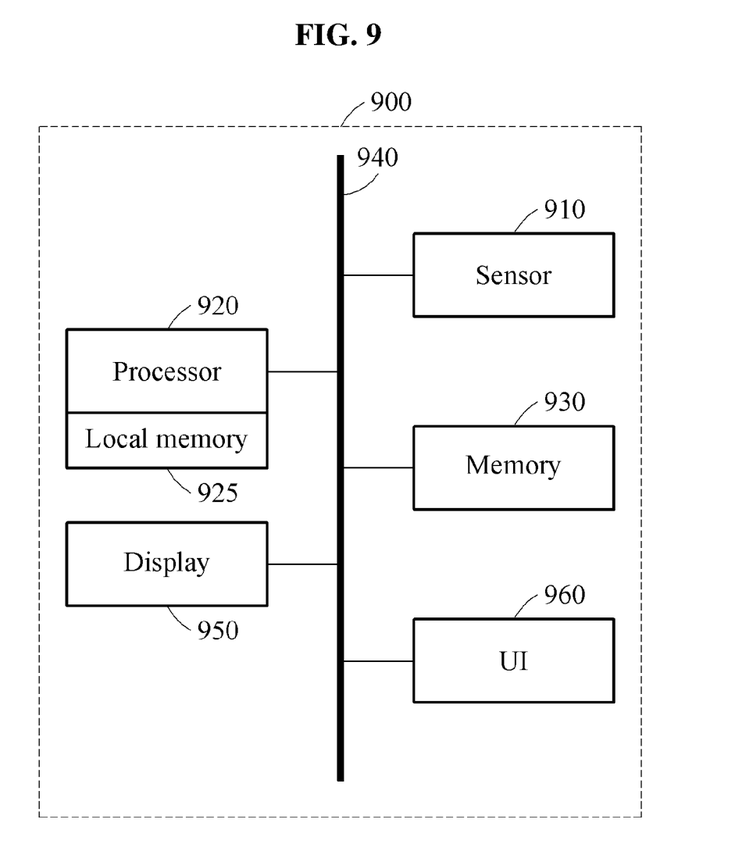
FIGS. 9 and 10 illustrate examples of machine translation apparatuses.
Figure 10:
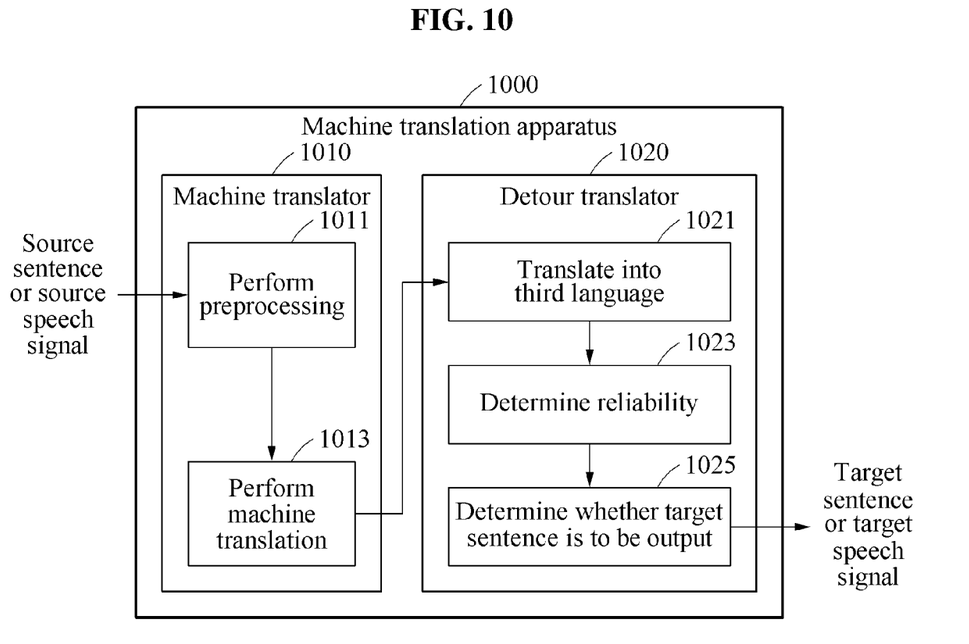

FIGS. 9 and 10 illustrate examples of machine translation apparatuses 900 and 1000.

FIG. 9 is a diagram illustrating an example of a machine translation apparatus 900.

Referring to FIG. 9, a machine translation apparatus 900 includes a sensor 910, a processor 920, a local memory 925, a memory 930, a display 950, and a user interface (UI) 960. The sensor 910, the processor, 920, the memory 930, the display 950, and the UI 960 communicate with each other via a bus 940. The machine translation apparatus 900 may correspond to any one or more or all of the above machine translation apparatuses and implement any one or more or all of the above machine translation methods. The local memory 925 may correspond to temporary or local buffers/memories. In an example, the local buffers/memories may be memories of the processor 920 or buffers/memories directly connected to the processor 920, e.g., configured for rapidly transferring data to/from the processor 920 and the local memory 925, noting that alternatives are also available. The local memory 925 and the memory 930 may further be allocated to store any one or any combination of any two or more of the speech signals, the source sentences, the target sentences, the third sentences, the similarities, the reliabilities, the accuracies, and the translation results as described above with reference to FIGS. 1 through 8.

The sensor 910 includes, for example, a microphone and/or an image sensor or camera to sense video data and audio data to recognize, reject, or verify an object, such as speech or text, for example. The sensor 910 senses speech or text using a well-known scheme, for example, a scheme of converting an audio signal into a speech signal or a scheme of converting an optical image to an electronic signal and recognizing text therefrom. An output of the sensor 910 is transferred to the processor 920 or the memory 930.

The processor 920 may be configured to perform one or more or all processes described with reference to FIGS. 1 through 8. For example, to speech recognition, text recognition, speech translation, or text translation, the processor 920 may detect, recognize, reject, translate, and/or verify one or more source sentences, input speech signals, input audio signals, text signals, or input images containing text. The result of any of the recognition, rejection, translation, or verification operations may be output through the display

950. In addition, user adjustments or selective operations of the electronic device 900 be provided by UI 960, which may include a touch screen or other input device/system. In an example, the processor 920 may be a graphics processor unit (GPU), a central processing unit (CPU), a reconfigurable processor, an application processor (AP), a neural processing unit (NPU), tensor processing unit (TPU), a HW accelerator, or otherwise an neuromorphic chip, or have any other type of multi- or single-processor configuration. In an example, the processor 920 is further representative of multiple processors, e.g., with at least one processor being configured as such specialized machine translation implementing processors and another processor configured to perform the other operations of the electronic device. Such specialized machine translation processors may also be configured in a secure area, with the corresponding processor 920 and local memory 925 being securely separated from other operations of other corresponding processors 920 and the memory 930, for example.

The memory 910 may store an instruction readable in a computer. For example, the processor 920 may perform the above-described operations in response to the instruction stored in the memory 910 being executed by the processor 920. The memory 910 includes, for example, a volatile memory or a nonvolatile memory.

The processor 920 is, for example, an apparatus configured to execute such instructions or programs, or to control the machine translation apparatus 900. The processor 920 translates a source sentence expressed in a source language into a target language to determine a target sentence, and determines a reliability of the target sentence based on a third sentence generated by translating at least one of the source sentence and the target sentence into a third language.

Also, the machine translation apparatus 900 processes the above-described operations.

Referring to FIG. 10, the machine translation apparatus 1000 includes a machine translator 1010 and a detour translator 1020.

The machine translator 1010 performs preprocessing of an input source sentence or a source speech signal in operation 1011. Through the preprocessing, the source speech signal is converted to a source sentence based on a speech recognition model, and the input source sentence or the source sentence generated by converting the source speech signal is modified to be suitable for a machine translation, or is partially processed.

In operation 1013, the machine translator 1010 translates the source sentence into a target language using a translation model to determine a target sentence. For example, a decoding process is used in the machine translator 1010, and a language model is also used.

The detour translator 1020 translates at least one of the source sentence and the target sentence into a third language to determine a third sentence in operation 1021. The detour translator 1020 determines a reliability of the target sentence based on the third sentence in operation 1023. The detour translator 1020 determines whether the target sentence is to be output based on the reliability in operation 1025. Based on a determination result in operation 1025, the detour translator 1020 outputs the target sentence as text, or converts text of the target sentence to a speech signal and outputs a target speech signal corresponding to the target sentence.

Also, the machine translation apparatus 1000 processes the above-described operations.

The machine translation apparatuses, processors, memories, machine translation apparatus 900, the sensor 910, the processor 920, the local memory 925, the memory 930, the bus 940, the display 950, the UI 960, the machine translation apparatus 1000, and the detour translator 1020 in FIGS. 1 through 10 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 through 10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented machine translation method comprising:
    generating a target sentence by translating a source sentence expressed in a source language into a target language; and
    determining a reliability of the target sentence based on a determined similarity between either third sentences generated by respectively translating the source sentence and the target sentence into a third language, or the target sentence and a comparison sentence generated by translating one of the third sentences into the target language.

2. The machine translation method of claim 1, further comprising determining whether to output the target sentence as a translation result of the source sentence based on the reliability.

3. The machine translation method of claim 2, further comprising outputting the target sentence in response to the reliability being greater than or equal to a threshold.

4. The machine translation method of claim 2, further comprising:
    converting the target sentence to a speech signal expressed in the target language and outputting the speech signal via a sensor, in response to determining to output the target sentence as a translation result of the source sentence,
    wherein the source sentence is a sentence generated by converting a speech signal obtained via a sensor.

5. The machine translation method of claim 1, wherein the determining of the reliability of the target sentence comprises determining the reliability based on the similarity between the third sentences generated by respectively translating the source sentence and the target sentence into the third language.

6. The machine translation method of claim 5, wherein the reliability of the target sentence increases in response to an increase in the similarity between the third sentences, and the reliability of the target sentence decreases in response to a decrease in the similarity between the third sentences.

7. The machine translation method of claim 1, wherein the determining of the reliability comprises:
    determining a first reliability of the target sentence based on a third sentence of the one or more third sentences and a respective weight; and
    determining a second reliability of another target sentence, generated by another translation of the source sentence expressed in the source language into the target language, based on another third sentence of the one or more third sentences and a respective other weight.

8. The machine translation method of claim 7, further comprising:
    indicating either one of the target sentence and the other target sentence as a translation result of the source sentence, based on a comparison of the first and second reliabilities.

9. The machine translation method of claim 1, wherein the determining of the reliability of the target sentence comprises:

generating the comparison sentence by translating, into the target language, the one of the third sentences generated by translating the source sentence into the third language; and determining the reliability of the target sentence based on the similarity between the target sentence and the comparison sentence.

10. The machine translation method of claim 1, wherein the determining of the reliability comprises:

generating the comparison sentence by translating, into the target language, the one of the third sentences generated by translating the target sentence into the third language; and determining the reliability of the target sentence based on the similarity between the target sentence and the comparison sentence.

11. The machine translation method of claim 1, wherein the third language comprises one or more languages other than the source language and the target language.

12. The machine translation method of claim 11, wherein the third language is selected from plural third languages based on a predetermined accuracy of a translation model used to translate between the third language and either one or both of the source language and the target language.

13. The machine translation method of claim 1, wherein the determining of the reliability of the target sentence comprises:

generating the third sentences by translating either one or both of the source sentence and the target sentence into each of a plurality of third languages; and determining the reliability of the target sentence based on the plurality of third sentences.

14. The machine translation method of claim 13, wherein the determining of the reliability of the target sentence comprises:

determining a similarity between third sentences of the plurality of third sentences expressed in a corresponding third language of the plurality of third languages; and determining the reliability of the target sentence based on the determined similarity.

15. The machine translation method of claim 14, wherein the determining of the reliability comprises:

determining a weight of the corresponding third language based on an accuracy of either one or both of a model that translates the source language into the corresponding third language and an accuracy of a model that translates the target language into the corresponding third language;

applying the determined weight to the similarity; and determining the reliability of the target sentence based on the product of the determined weight and the similarity.

16. The machine translation method of claim 13, wherein the determining of the reliability comprises:

generating the comparison sentence by translating, into the target language, the one of the third sentences; and determining the reliability of the target sentence based on the similarity between the target sentence and the comparison sentence.

17. A non-transitory computer-readable storage medium storing instructions that, when executed by a processor, cause the processor to perform the machine translation method of claim 1.

18. A machine translation apparatus comprising:
one or more processors configured to:

generate a target sentence by translating a source sentence expressed in a source language into a target language; and determine a reliability of the target sentence based on a determined similarity between either third sentences generated by respectively translating the source sentence and the target sentence into a third language, or the target sentence and a comparison sentence generated by translating one of the third sentences into the target language.

19. The machine translation apparatus of claim 18, wherein the one or more processors are configured to determine the reliability of the target sentence based on the similarity between the third sentences generated by respectively translating the source sentence and the target sentence into the third language.

20. The machine translation apparatus of claim 18, wherein the one or more processors are configured to:

generate the comparison sentence by translating, into the target language, the one of the third sentences generated by translating the source sentence into the third language; and determine the reliability of the target sentence based on the similarity between the target sentence and the comparison sentence.

21. The machine translation apparatus of claim 18, wherein the one or more processors are configured to:

generate the comparison sentence by translating, into the target language, the one of the third sentences generated by translating the target sentence into the third language; and determine the reliability of the target sentence based on the similarity between the target sentence and the comparison sentence.

22. The machine translation apparatus of claim 18, wherein the third language comprises one or more languages other than the source language and the target language.

23. The machine translation apparatus of claim 18, further comprising:

a memory configured to store one or more instructions,
wherein the one or more processors are configured to generate the target sentence and determine the reliability of the target sentence, in response to executing the one or more instructions.

24. A processor-implemented machine translation method comprising:

generating target sentences by translating a source sentence expressed in a source language into a target language;

determining a reliability of each of the target sentences based on a determined similarity between either respective translations of the source sentence and the target sentence into a language different than the source language and the target language, or the target sentence and a translation of one of the respective translations into the target language; and indicating, as a translation result of the source sentence, a target sentence of the target sentences corresponding to a highest reliability of the reliabilities.

25. The machine translation method of claim 24, further comprising generating one or more different language sentences by translating either one or both of the source sentence and the target sentences into the different language.

26. The machine translation method of claim 25, wherein the determining of the reliabilities of the target sentences comprises determining the reliabilities based on similarities between different language sentences of the one or more different language sentences.

27. The machine translation method of claim 25, further comprising generating one or more comparison sentences by translating the one or more different language sentences into the target language,
   wherein the determining of the reliabilities of the target sentences comprises determining the reliabilities based on similarities between the target sentences and the one or more comparison sentences.

* * * * *